United States Patent [19]
Ando et al.

[11] Patent Number: 5,648,857
[45] Date of Patent: Jul. 15, 1997

[54] MANUFACTURING METHOD FOR HOLOGRAM WHICH CAN PREVENT THE FORMATION OF GHANT HOLOGRAMS DUE TO NOISE LIGHT

[75] Inventors: Hiroshi Ando; Teiyuu Kimura, both of Nagoya; Minako Sugiura, Anjo; Yoshikatsu Ichikawa, Hazu-gun, all of Japan

[73] Assignee: Nippondenso Co., Ltd., Kariya, Japan

[21] Appl. No.: 389,321

[22] Filed: Feb. 16, 1995

[30] Foreign Application Priority Data

Feb. 18, 1994 [JP] Japan .................................. 6-45019

[51] Int. Cl.$^6$ .................................. G03H 1/20; G02B 5/30
[52] U.S. Cl. .................................. 359/12; 359/30; 359/493; 359/494; 359/601; 359/614
[58] Field of Search .................................. 359/12, 30–493, 359/494, 495, 601, 614

[56] References Cited

U.S. PATENT DOCUMENTS

| | | | |
|---|---|---|---|
| 3,796,476 | 3/1974 | Frosch et al. | 359/1 |
| 4,691,994 | 9/1987 | Afian et al. | 359/900 |
| 5,103,232 | 4/1992 | Magarinos et al. | 359/8 |
| 5,330,264 | 7/1994 | Ando et al. | 359/12 |

FOREIGN PATENT DOCUMENTS

| | | |
|---|---|---|
| 6468784 | 3/1989 | Japan . |
| 2140787 | 5/1990 | Japan . |
| 4198980 | 7/1992 | Japan . |
| 4198981 | 7/1992 | Japan . |
| 4329585 | 11/1992 | Japan . |
| 5203812 | 8/1993 | Japan . |

*Primary Examiner*—Jon W. Henry
*Attorney, Agent, or Firm*—Cushman, Darby & Cushman IP, Group of Pillsbury Madison & Sutro, L.L.P.

[57] ABSTRACT

A manufacturing method for a hologram which can control the formation of a ghost hologram due to a surface reflected light caused on an interface with the atmosphere is disclosed. In the first manufacturing method for a hologram by a two-beam method or a one-beam method, on an interface between a substrate having a hologram photosensitive layer and the atmosphere is disposed a quarter-wave plate, and an incident light is converted from a circularly polarized light to a P-polarized light (or an S-polarized light) through the quarter-wave plate. On the other hand, in the second manufacturing method for a hologram, a substrate, which has a hologram photosensitive layer, is fittingly held by prisms on both sides thereof. A reference light is a P-polarized light, and an angle of the reference light to a surface reflected light on an interface of the reference light is set to be approximate to a right angle. It is appropriate that a reproduced hologram is manufactured by the one-beam method by using a hologram manufactured by the above method as a master hologram.

9 Claims, 6 Drawing Sheets

MANUFACTURING METHOD FOR HOLOGRAM WHICH CAN PREVENT THE FORMATION OF GHANT HOLOGRAMS DUE TO NOISE LIGHT

CROSS REFERENCE TO RELATED APPLICATION

This application is based upon and claims the benefit of priority of the prior Japanese Patent application No. 6-45019 filed on Feb. 18, 1994, the contents of which are incorporated herein by reference.

BACKGROUND OF THE INVENTION

1. Field of the Invention

The present invention generally relates to a manufacturing method for a hologram. More particularly, the present invention relates to a manufacturing method for a hologram which can control the formation of a ghost hologram formed by a noise light.

2. Related Arts

When a hologram is formed by irradiating object light and reference light on to a substrate having a hologram photosensitive layer, the object light or reference light will sometimes enter off the normal optical path and consequently a ghost hologram is formed. A major cause of the formation of this ghost hologram is a surface reflected light of the object light or reference light reflected on an interface with the atmosphere both of which have a different refractive index.

Figure 8:
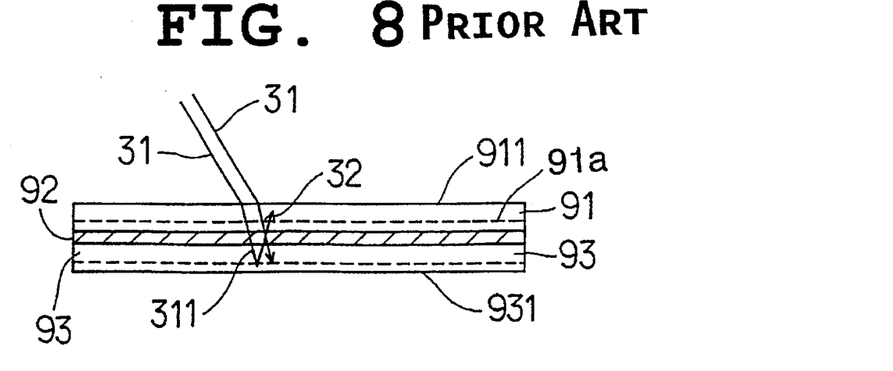
FIG. 8 is an illustrative view illustrating a conventional manufacturing method for a hologram.

As illustrated in FIG. 8, for example, there is a method of forming an interference fringe in a photosensitive layer 91a of a substrate 91 for reproduction. The reproduction method (a one-beam method using a master hologram) is as follows: The substrate 91 is disposed on a master hologram 93 with a refractive index adjusting liquid 92 interposed therebetween; a reference light 31 enters from the surface of the substrate 91; a transmitted light 311 of the reference light 31 is diffracted and reflected by the master hologram 93; and the diffracted light is interfered as an object light 32 with the reference right 31 to thereby form the interference fringe.

Figure 9:
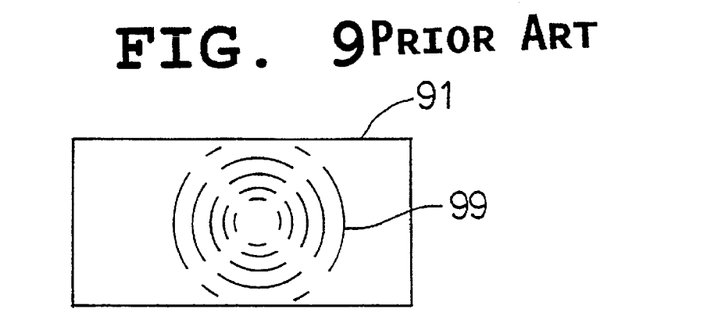
FIG. 9 is a view illustrating an example of a ghost hologram manufactured by the manufacturing method of FIG. 8.

In this case, for example, when the transmitted light 311 transmits the master hologram 93 and is re-reflected on a surface 931, a surface reflected light (not illustrated) of the transmitted light 311 forms a ring-like interference fringe 99 illustrated in FIG. 9 in interference with the reference light 31. This constitutes a ghost hologram.

In some other cases, the object light 32 transmitted through the substrate 91 is re-reflected on a surface 911 and this surface reflected light (not illustrated) of the object light 32 forms an interference fringe in interference with the normal object light 32.

The above can also the case even when a reflection type optical element is used instead of the master hologram 93 of FIG. 8.

In the same way, also in a two-beam method in which an object light and a reference light enter from above and below a substrate having a photosensitive layer, the surface reflected lights thereof form ghost holograms on surfaces. When a hologram having a ghost hologram as above used as a master hologram is reproduced, a similar ghost hologram is formed on a reproduced hologram.

In order to control the formation of the ghost hologram due to surface reflected lights, there have been several proposals.

Figure 10:
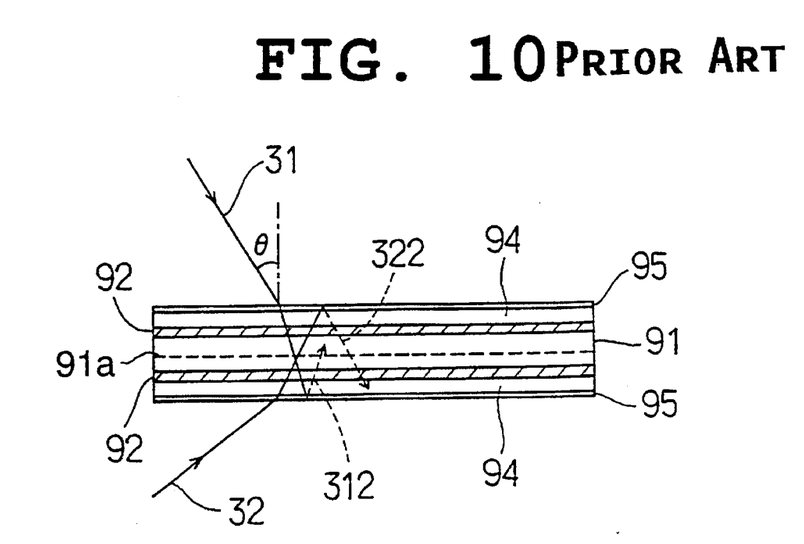
FIG. 10 is a view illustrating an improved manufacturing method for a conventional hologram.

For example, as illustrated in FIG. 10, a method has been proposed that antireflection-coating glasses 95 should be disposed on surfaces to control the surface reflected lights (See Japanese Unexamined Patent Publication No. 4-198981).

Specifically, antireflection-coating glass 95 is disposed on surfaces of optical glasses 94 disposed on both sides of the substrate 91 adjacent the refractive index adjusting liquids 92 to control surface reflected lights 322 and 312 of the object light 32 and reference light 31 respectively.

However, in this method using the antireflection-coating glass (FIG. 10), if an incident angle θ to the antireflection-coating glass is large, the reflectivity increases, and as a result, a sufficient effect can not be obtained.

Figure 11:
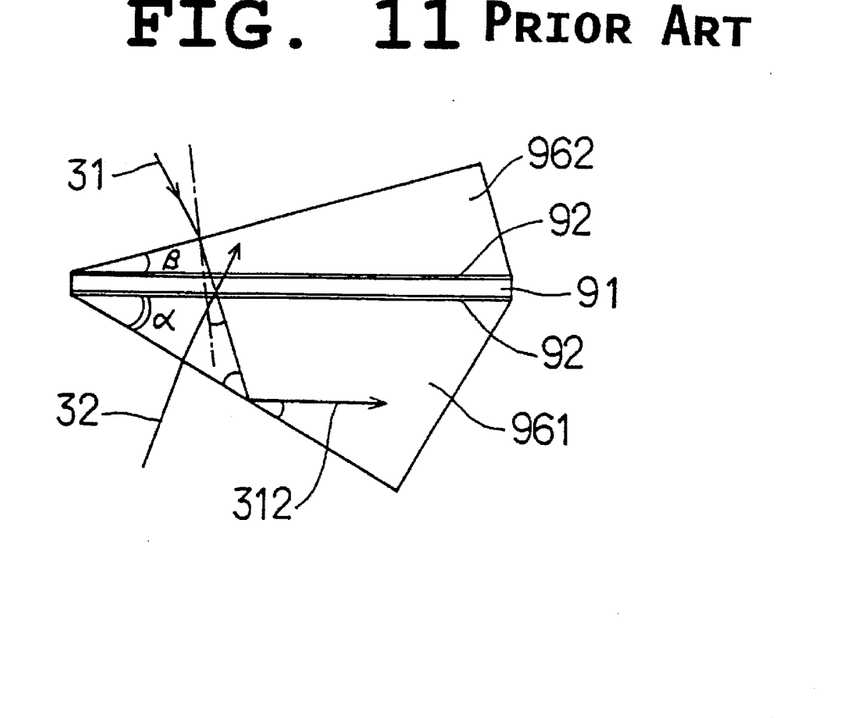
FIG. 11 is a view illustrating an improved manufacturing method for a conventional hologram.
Figure 12:
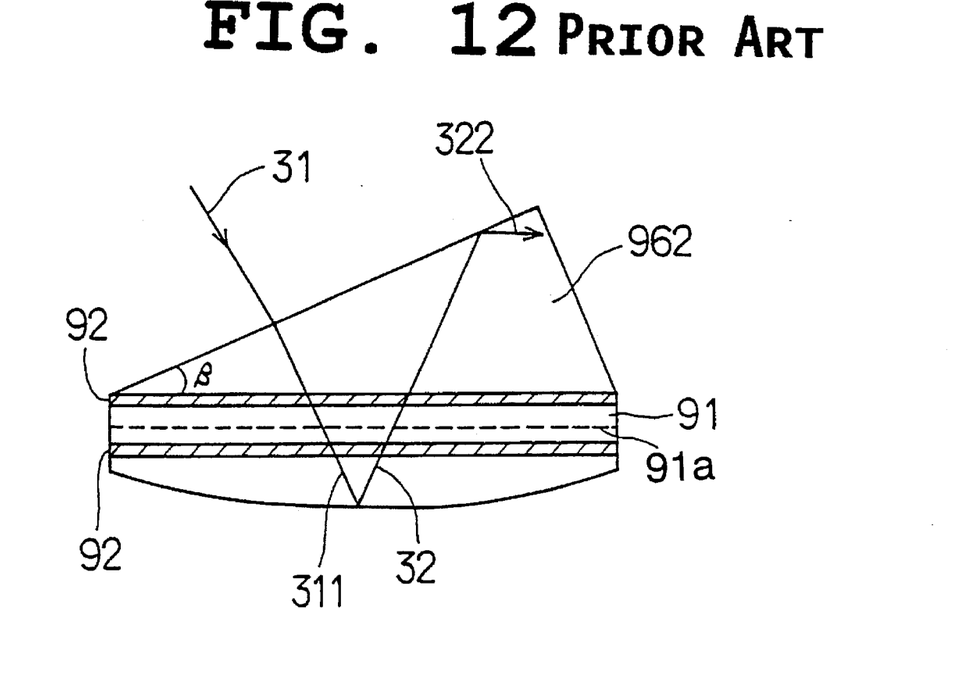
FIG. 12 is a view illustrating an improved conventional manufacturing method for a hologram.

On the other hand, as illustrated in FIGS. 11 and 12, a method has been proposed that prisms 961 and 962 for optical path change should be disposed to prevent the surface reflected lights 312 and 322 of the reference light 31 and object light 32 respectively from entering the substrate 91. (See Japanese Unexamined Patent Publication No. 4-19898).

However, in the method in which the prisms 961 and 962 are used to prevent the surface reflected lights 312 and 322 from entering the substrate 91 again (FIGS. 11 and 12), the vertical angles β and β of the prisms 961 and 962 respectively are considerably large. As a result, there is a problem that the space required for manufacturing a hologram is large.

SUMMARY OF THE INVENTION

An object of the present invention is to provide a manufacturing method for a hologram which can control the formation of a ghost hologram due to surface reflected lights on interfaces and at a larger same time does not require the increase in manufacturing space.

The first aspect of the present invention utilizes an arrangement wherein two light fluxes both of which have been P-polarized (the vibration direction of the electric field vector is parallel to the incident plane of a substrate having a photosensitive layer) or S-polarized (the vibration direction of the electric field vector is perpendicular to the incident plane of the substrate) are irradiated from two respective different directions to the substrate for hologram formation to form an interference fringe on the hologram photosensitive layer.

The first aspect of the present invention also uses an arrangement wherein quarter-wave plates are disposed on the incident planes of the above two light fluxes respectively and circularly polarized lights are used as lights to be emitted from light sources.

That is, the most noteworthy arrangement is that the two light fluxes which form an interference fringe on the hologram photosensitive layer are both P-polarized lights (or S-polarized lights) and that the P-polarized lights (or S-polarized lights) can be obtained by passing circularly polarized lights through the quarter-wave plates provided on the interfaces. In the above description, the "interface" means a boundary plane between an optical material including a substrate (substrate, refractive index adjusting liquid, coat material, etc., the refractive indexes of which are almost the same) and an outside atmosphere having a refractive index different from the refractive index of the optical material (hereinafter, this definition is to be applied hereto).

Next, the mode of operation and effect of the first aspect of the present invention will be described.

In the first aspect of the present invention, the luminous fluxes which form an interference fringe (object light and reference light) are both P-polarized lights (or S-polarized lights), and quarter-wave plates are formed on the interfaces with the outside atmosphere. The lights emitted from respective light sources which enters the above interfaces are circularly polarized lights. These lights turn to be linearly polarized lights (P-polarized lights or S-polarized lights) by passing through the quarter-wave plate on the interface respectively. These lights form the reference light and object light respectively.

On the other hand, the above object light or the reference light is reflected on the interfaces having refractive indexes different from the refractive index of the optical member including the substrate. When this reflected light enters the substrate again, generally the surface reflected light acts as a noise light and forms a ghost hologram on the hologram photosensitive layer of the substrate. According to the present invention, however, as the quarter-wave plates have been formed on the interfaces, the above surface reflected light reflected on the interface reciprocates between the quarter-wave plates (one reciprocation is composed of incidence and reflection).

While reciprocating between the quarter-wave plates, the P-polarized light (or an S-polarized light) turns to be an S-polarized light (or a P-polarized light) (i.e., P-polarized light changes to circularly polarized light by transmitting through the quarter-wave plate and is reflected on the interface of the quarter-wave plate, and then the reflected circularly polarized light changes to S-polarized light by through the quarter-wave plate). Therefore, the above surface reflected light turns to be an S-polarized light (or a P-polarized light), the electric field direction of which crosses with the normal object light and reference light at right angles.

As a result, there is no formation of an interference fringe between the object light and reference light and the surface reflected light.

In short, the hologram manufacturing method according to the present invention does not form ghost holograms due to surface reflected light.

On the other hand, the second aspect of the present invention is a manufacturing method for a hologram which is arranged so that a first prism having a vertical angle $\psi_1$ and a second prism having a vertical angle $\psi_2$ are fittingly held on both sides of a substrate for supporting a hologram photosensitive layer, a reference light is irradiated from the first prism side to the substrate and an object light is irradiated from the second prism side to the substrate, and thereby an interference fringe is formed on the hologram photosensitive layer on the substrate.

The second aspect of the present invention includes an arrangement wherein the above referenced light is a P-polarized light and the relation of the vertical angles $\psi_1$ and $\psi_2$ of the above prisms respectively to the incident angle $\theta$ of the reference light has been pre-fixed so that the angle a between the surface reflected light of the reference light reflected to the substrate side on the interface of the second prism, to the reference light entering from the first prism and traveling to the substrate can be approximate to a right angle.

The most noteworthy arrangement of this aspect of the present invention is that both the reference light and the object light are P-polarized lights and that the vertical angles $\psi_1$ and $\psi_2$ of the prisms has been fixed so that the angle a between the surface reflected light of the reference light reflected to the substrate side on the interface of the second prism to the reference light entered from the first prism and traveling to the substrate can be approximate to a right angle.

According to the manufacturing method of the second aspect, because the angle of the reference light travelling to the substrate having the hologram photosensitive layer to the surface reflected light is approximate to a right angle, the angle of electric field directions of both the lights is approximate to a right angle, and therefore, there is practically no formation of an interference fringe. Namely, there is no formation of a ghost hologram due to the surface reflected light of the reference light on the hologram photosensitive layer of the substrate.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

The first aspect of the present invention is has two light fluxes both of which have been P-polarized (the vibration direction of the electric field vector is parallel to the incident plane of a substrate which has a hologram photosensitive layer) or S-polarized (the vibration direction of the electric field vector is perpendicular to the incident plane of the substrate) which are irradiated from two respective different directions to the substrate for hologram formation to form an interference fringe on the hologram photosensitive layer of the substrate.

The first aspect of the present invention further has quarter-wave plates disposed on the incident planes of the above two light fluxes respectively and circularly polarized lights are used as lights to be emitted from light sources.

That is, the most noteworthy arrangement is that the two light fluxes which form an interference fringe on the hologram photosensitive layer are both P-polarized lights (or S-polarized lights) and that the P-polarized lights (or S-polarized lights) can be obtained by passing circularly polarized lights through the quarter-wave plates provided on the interfaces. In the above description, the "interface" means a boundary plane between optical materials including the substrate having the hologram photosensitive layer (e.g., substrate, refractive index adjusting liquid, coat material, etc., all of which have the almost same refractive indexes) and an outside atmosphere having a refractive index different from the refractive index of the optical materials (hereinafter, this definition is to be applied hereto).

For example, when a hologram is manufactured by the one-beam method, the reference light is a linearly polarized light converted from a circularly polarized light to a P-polarized light (or an S-polarized light) through a quarterwave plate, while the object light is P-polarized light (or S-polarized light) which is the above reference light passed through the substrate and reflected by using the optical element.

When the two-beam method is used, quarter-wave plates are disposed on both the upper and lower sides of the substrate respectively, circularly polarized lights are irradiated to the quarter-wave plates for conversion to P-polarized lights (or S-polarized lights), and thereby the object light and the reference light are obtained.

Next, the mode of operation and effect of the first aspect of the present invention will be described.

In the first aspect of the present invention, the luminous fluxes which form an interference fringe (object light and reference light) are both P-polarized lights (or S-polarized lights), and quarter-wave plates are formed on the interfaces with the outside atmosphere. The lights emitted from respective light sources and impinge onto the above interfaces are circularly polarized lights. These lights turn to be linearly polarized lights (P-polarized lights or S-polarized lights) by passing through the quarter-wave plate on the interface respectively. These lights constitute the reference light and object light respectively.

On the other hand, the above object light or the reference light is reflected on the interfaces having refractive indexes different from the refractive index of the optical member including the substrate having the hologram photosensitive layer. When this reflected light enters the substrate again, generally the surface reflected light acts as a noise light and forms a ghost hologram on the hologram photosensitive layer. According to the present invention, however, as the quarter-wave plates have been formed on the interfaces, the above surface reflected light reflected on the interface reciprocates between the quarter-wave plates (one reciprocation is composed of incidence and reflection).

During reciprocating between the quarter-wave plates, the P-polarized light (or an S-polarized light) turns to be an S-polarized light (or a P-polarized light) (i.e., P-polarized light changes to circularly polarized light by transmitting the quarter-wave plate and is reflected on the interface of the quarter-wave plate, and then the reflected circularly polarized light changes to S-polarized light by re-penetrating the quarter-wave plate). Therefore, the above surface reflected light turns to be an S-polarized light (or a P-polarized light), the electric field direction of which crosses with the normal object light and reference light at right angles.

As a result, there is no formation of an interference fringe between the object light and reference light and the surface reflected light.

In short, by the hologram manufacturing method according to the present invention, there is no formation of a ghost hologram due to surface reflected light.

Furthermore, when the characteristics of the quarter-wave plate are adjusted to the incident angle, a stable ghost hologram controlling effect which is independent of the incident angle of the surface reflected light can be obtained, while conventional methods are dependent on the incident angle by employing the antireflection-coating glass.

Moreover, there is practically no increase in manufacturing space by providing the thin quarter-wave plate on the interface.

As described above, according to the first aspect of the present invention, a hologram manufacturing method which can control the formation of the ghost hologram due to the surface reflected light on the interface and which does not result in an increase in the amount of required manufacturing space can be provided.

On the other hand, the second aspect of the present invention is a manufacturing method for a hologram which is so arranged that a first prism having a vertical angle $\psi_1$ and a second prism having a vertical angle $\psi_2$ are fittingly held on both the sides of a substrate having a hologram photosensitive layer for hologram formation, a reference light is irradiated from the first prism side to the substrate and an object light is irradiated from the second prism side to the substrate, and thereby an interference fringe is formed on the hologram photosensitive layer of the substrate.

In the second aspect of the present invention, the reference light is a P-polarized light and the relation of the vertical angles $\psi_1$ and $\psi_2$ of the above prisms respectively to the incident angle $\theta$ of the reference light has been pre-fixed so that the angle a between the surface reflected light of the reference light reflected to the substrate on the interface of the second prism to the reference light entered from the first prism and traveling to the substrate can be approximate to a right angle.

The most noteworthy arrangement of this aspect of the present invention is that both the reference light and the object light are P-polarized lights and that the vertical angles $\psi_1$ and $\psi_2$ of the prisms have been fixed so that the angle a between the surface reflected light of the reference light reflected to the substrate on the interface of the second prism to the reference light entered from the first prism and traveling to the substrate can approximate a right angle.

The above angle a is determined by the noise level to be controlled. In order to control the noise level to be 5% or less, the angle a should preferably be within 90°±2.87°, and should more preferably be within 90°±0.57°.

The more the angle a approximates a right angle, the larger the effect of controlling a ghost hologram due to the reflection of the reference light on the interface is. This is because when the angle a is within 90°±2.87°, the ghost hologram formation percentage is 5% or less, and when the angle a is within 90°±0.57°, the ghost hologram formation percentage is 1% or less.

Incidentally, in the second aspect of the present invention, the angle b between the surface reflected light of the object light on the first prism and the object light entered from the second prism should also preferably approximate a right angle.

The reasons for the above are as follows:

As described in detail herein later, in a hologram manufactured by the manufacturing method according to the second aspect of the present invention, a ghost hologram due to the surface reflected light is not contained in the reproduced light obtained by irradiating the reference light from the surface side on which the first prism is disposed.

On the other hand, when the angle b is set to approximate a right angle, a ghost hologram is not contained either in the reproduced light obtained by irradiating the reference light from the opposite side of the first prism.

Figure 4:
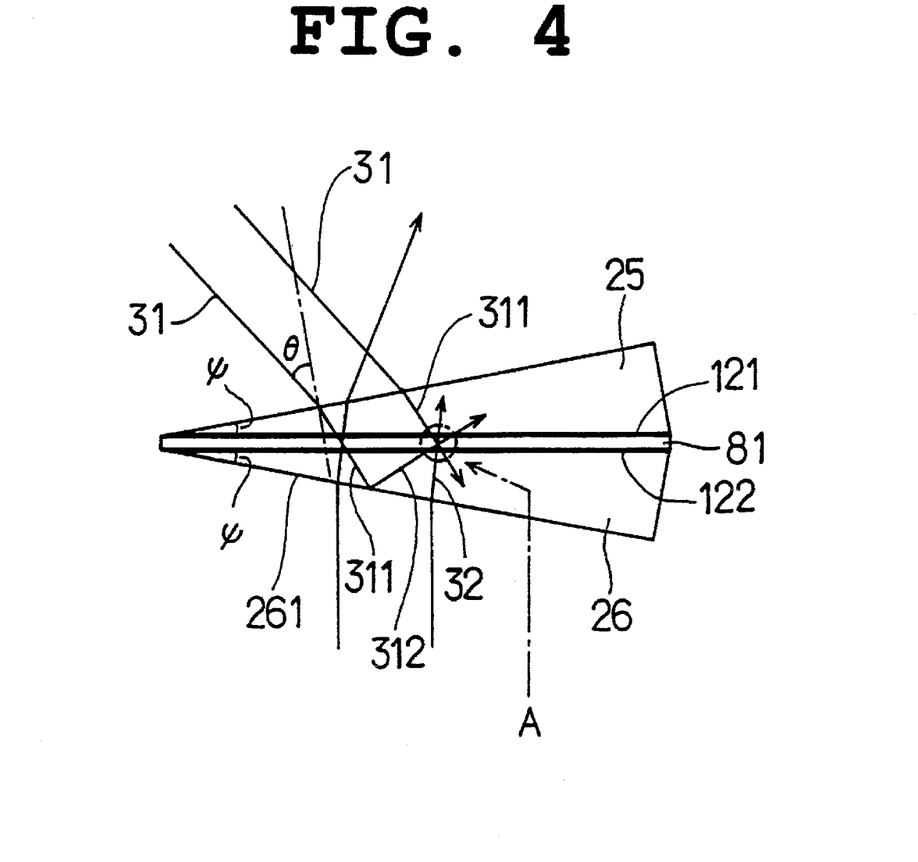
FIG. 4 is a system constructional view illustrating the hologram manufacturing method according to a third embodiment (two-beam method) of the present invention.

Also in the above second aspect of the present invention, it is preferable that the above two prisms should be disposed so that the vertical angles thereof can be positioned in the same direction and that both the vertical angles $\psi_1$ and $\psi_2$ should be set to be the same $\psi_1=\psi_2=\psi$ (See FIG. 4).

Figure 7:
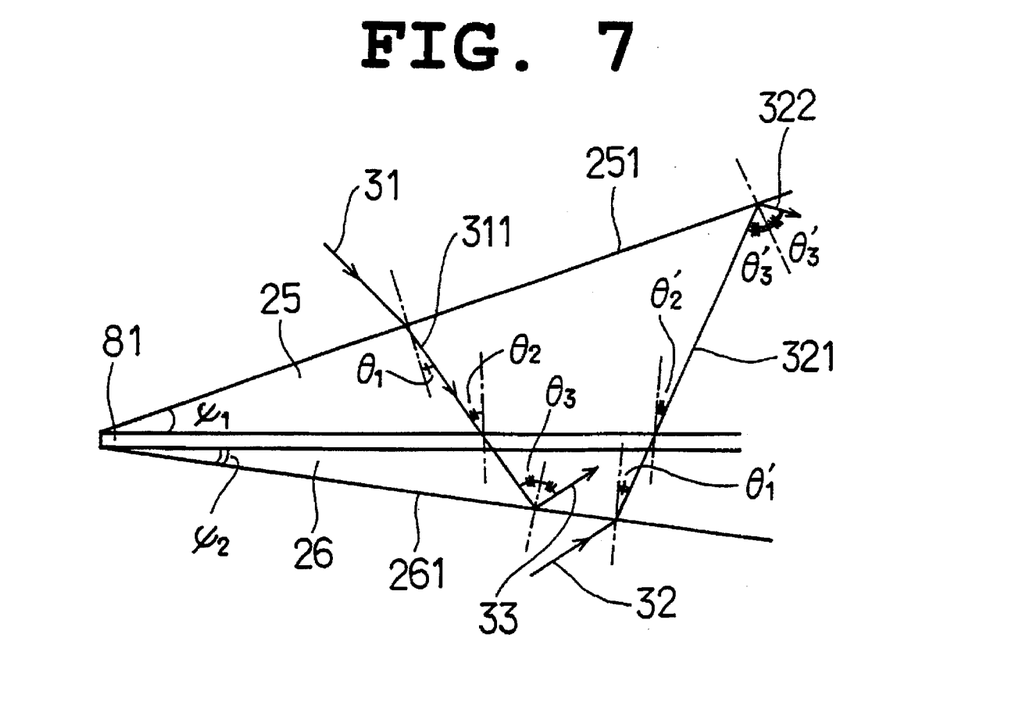
FIG. 7 is a system constructional view for additionally illustrating the second aspect of the present invention.

The reasons for the above are as follows:

As described in detail herein later, when the angle of the light (refracted light) 311 entering the first prism 25 to the normal line is $\theta_1$, as illustrated in FIG. 7, the angle of the incident light 311 to the normal of the substrate 81, $\theta_2$, is shifted by the vertical angle $\psi_1$ ($\theta_2=\theta_1+\psi_1$), and the angle of the incident light 311 to the normal line on the interface 261 of the second prism 26, $\theta_3$, is increased by the sum of the vertical angles ($\psi_1+\psi_2$) (i.e., $\theta_3=\theta_1+\psi_1+\psi_2$). That is, the above angle $\theta_2$ is shifted by the vertical angle $\psi_1$, and the above angle $\theta_3$ is shifted by the sum of the vertical angles ($\psi_1+\psi_2$).

The above is also the case with the light 321 entering the second prism at an angle $\theta_1'$ from the opposite side (when the vertical angle $\psi_1$ is exchanged by the vertical angle $\psi_2$, $\theta_2'=\theta_1'+\psi_2$, and $\theta_3'=\theta_1'+\psi_1+\psi_2$).

Here, when $\psi_1=\psi_2$, both the prisms can be disposed on both the sides of the substrate in a well balanced manner without unduly protruding on either the upper or the lower side of the substrate.

Furthermore, as described in detail later herein, the hologram manufactured by the second aspect of the present invention has little ghost hologram due to the surface reflected light. Therefore, by using this hologram as a master hologram, a reproduced hologram with little ghost hologram can efficiently be manufactured by a simple optical system in a small manufacturing space.

This is because the manufacturing method for a reproduced hologram by using the master hologram requires a smaller manufacturing space, compared to a case where the hologram is manufactured using other optical elements such as a lens (FIG. 12) and a complicated image can easily be recorded by the hologram.

That is, because the hologram is a thin layer, the hologram does not require as large a space as lens and other optical elements require, and the size of the hologram remains unchanged even if the hologram is provided with complicated diffractive characteristics. On the other hand, lens and other optical elements require manufacturing equipment for overlaying a plurality of optical elements to realize the complicated characteristics, and in this case the optical system is complicated. Therefore, it is difficult to manufacture a quality hologram within a small manufacturing space.

As a manufacturing method for a hologram by the one-beam method using the master hologram manufactured according to the second aspect of the present invention, for example, there is a manufacturing method for a hologram which has a prism for reproduction having the same vertical angle $\psi_1$ as the vertical angle of the above first prism according to the second aspect of the present invention, a substrate for reproduction is disposed on the first surface forming the vertical angle of the prism for reproduction, and the above master hologram is disposed on the second surface forming the vertical angle. In this device the same reference light is irradiated at the same angle as those used for manufacturing the above master hologram from the side of the first surface of the above prism for reproduction, an interference fringe is formed on a hologram photosensitive layer of the substrate for reproduction by the reference light and the reproduced light obtained by the reference light diffracted by the master hologram (a manufacturing method for a reproduced hologram based on the second aspect of the present invention).

When this method is employed, the same first prism as that used for manufacturing the master hologram according to the second aspect of the present invention can be used as a prism for reproduction and at the same time, a reproduced hologram can be manufactured by irradiating the same reference light at the same angle as those used for manufacturing the master hologram to the prism for reproduction.

That is, the manufacturing conditions of the master hologram can be set to be extremely similar to the manufacturing conditions of the reproduced hologram.

At this time, as the same reference light is irradiated to the master hologram from the same direction as those used for manufacturing the master hologram, the reproduced light of the master hologram is the same object light as that used for manufacturing the master hologram.

Additionally, as this reproduced light contains practically no ghost hologram noise due to the surface reflected light, an extremely high quality object light can be obtained.

Therefore, the manufacturing conditions of the reproduced hologram are extremely similar to the manufacturing conditions of the master hologram, and a reproduced hologram which is extremely similar to the master hologram can be manufactured.

Incidentally, in the manufacturing method for this reproduced hologram, it is preferable that antireflection-coating glass should be provided to the interface (at the side of the outside atmosphere) of the substrate for reproduction.

This is because when the antireflection-coating glass is provided, the reproduced light (object light) of the master hologram is reflected on the above interface, and thereby it can be controlled that this reflected reproduced light turns to be a noise light and a ghost hologram is formed in the reproduced hologram.

On the other hand, the interface of the substrate for reproduction may be provided with a quarter-wave plate. In this case, as the polarizing direction of the reproduced light of the master hologram changes during the time when the reproduced light reciprocates the quarter-wave plate (i.e., S-polarized light changes to P-polarized light, P-polarized light changes to S-polarized light), there is no formation of an interference fringe on the interface between the surface reflected light and the reproduced light. In this case, however, the reference light to enter the quarter-wave plate should circularly be polarized. This reference light turns to be a P-polarized light (or an S-polarized light) by passing through the quarter-wave plate, and enters the substrate for reproduction.

Furthermore, it is preferable that a quarter-wave plate should be provided on the interface of the master hologram with the outside atmosphere.

By providing the quarter-wave plate, the surface reflected light of the reference light which has been P-polarized (or S-polarized) reciprocates the quarter-wave plate and therefore turns to be an S-polarized light (or a P-polarized light when the reference light is a S-polarized light). As a result, there is no formation of an interference fringe between the above surface reflected light (S-polarized light or P-polarized light) and the corresponding reference light (P-polarized light or S-polarized light) and therefore there is no formation of a ghost hologram due to the surface reflected light.

Alternatively, instead of the above quarter-wave plate, an optical absorbing film may be provided on the interface (on the atmosphere side) of the master hologram.

When the optical absorbing film is provided, the reference light transmitted the master hologram is absorbed by the interface. As a result, the surface reflected light can substantially be reduced, and the formation of a ghost hologram on the reproduced hologram can be controlled.

Next, the mode of operation and effect of the second aspect of the present invention will be described.

According to the manufacturing method of the second aspect, as illustrated in FIG. 7, both the sides of the substrate 81 forming a hologram in the photosensitive layer thereof are fittingly held by the first and second prisms 25 and 26.

The vertical angle of the first prism 25 is $\psi_1$, while the vertical angle of the second prism 26 is $\psi_2$.

The reference light 31 enters from the first prism 25. When the angle of the reference light 311 travelling through the first prism 25 to the substrate 81 to the normal line $N_1$ on the first interface 251 is $\theta_1$ (refractive angle $\theta_1$), the incident angle to the substrate 81, $\theta_2$, is $(\theta_1+\psi_1)$ (when the vertical angle of the first prism 25 is disposed on the opposite side of the substrate 81, $\psi_1$ is set to be negative).

The incident angle to the second interface 261 due to the second prism 26, $\theta_3$, is $(\theta_2+\psi_2)$, i.e., $(\theta_1+\psi_1+\psi_2)$.

The angle of the surface reflected light 33 of the reference light 311 to the reference light 311 on the second prism 26, a, is $2\theta_3$, i.e., $2(\theta_1+\psi_1+\psi_2)$. (i.e., $a=2(\theta_1+\psi_1+\psi_2)$).

As the above angle a is approximate to a right angle ($\pi/2$), $$(\psi_1+\psi_2) \approx \pi/4 - \theta_1 \quad (1)$$

(In this equation, $\approx$ means proximity.)

Incidentally, the reference light 311 is a P-polarized light.

As the angle of the reference light 311 travelling to the substrate 81 to the surface reflected light 33 is approximately a right angle, the angle of electric field directions of both the lights 311 and 33 is approximately a right angle, and therefore, there is practically no formation of an interference fringe. Namely, there is no formation of a ghost hologram due to the surface reflected light 33 of the reference light 31 on the hologram photosensitive layer of the substrate 81.

This is because when an interference fringe is formed by two P-polarized lights, the contrast (strength) of the interference fringe formed thereby is, when the angle of both the lights is $\Phi$, proportional to $\cos\Phi$.

On the other hand, as the incident angle of the reference light 311 to the substrate 81, $\theta_2$ (=$\psi_1+\theta_1$), is generally within a range from 20° to 50°, it is calculated from Equation (1) that the vertical angle $\psi_2$ is within a range from −5° to 25° or so. Therefore, both the vertical angles $\psi_1$ and $\psi_2$ can be controlled to smaller values.

Accordingly, even if the prisms 25 and 26 are provided, there is no need to increase the manufacturing space.

As described above, according to the second aspect of the present invention, a hologram manufacturing method can control the formation of a ghost hologram due to the surface reflected light on the interface of the reference light and does not need a larger manufacturing space.

Furthermore, in FIG. 7, when the angle of the surface reflected light 322 of the object light 32 to the objective light 321 travelling to the substrate 81, b (=$2\theta_3'$), is set to approximately a right angle, there is no formation of a ghost hologram due to the surface reflected light 322.

For the information, the equation of conditions in FIG. 7 is $$\psi_1+\psi_2 \approx \pi/4 - \theta_1' \quad (2)$$

($\theta_1'$ is the angle of the object light 321 to the normal on the interface 261 of the second prism 26 as illustrated in FIG. 7.)

(First Embodiment)

Figure 1:
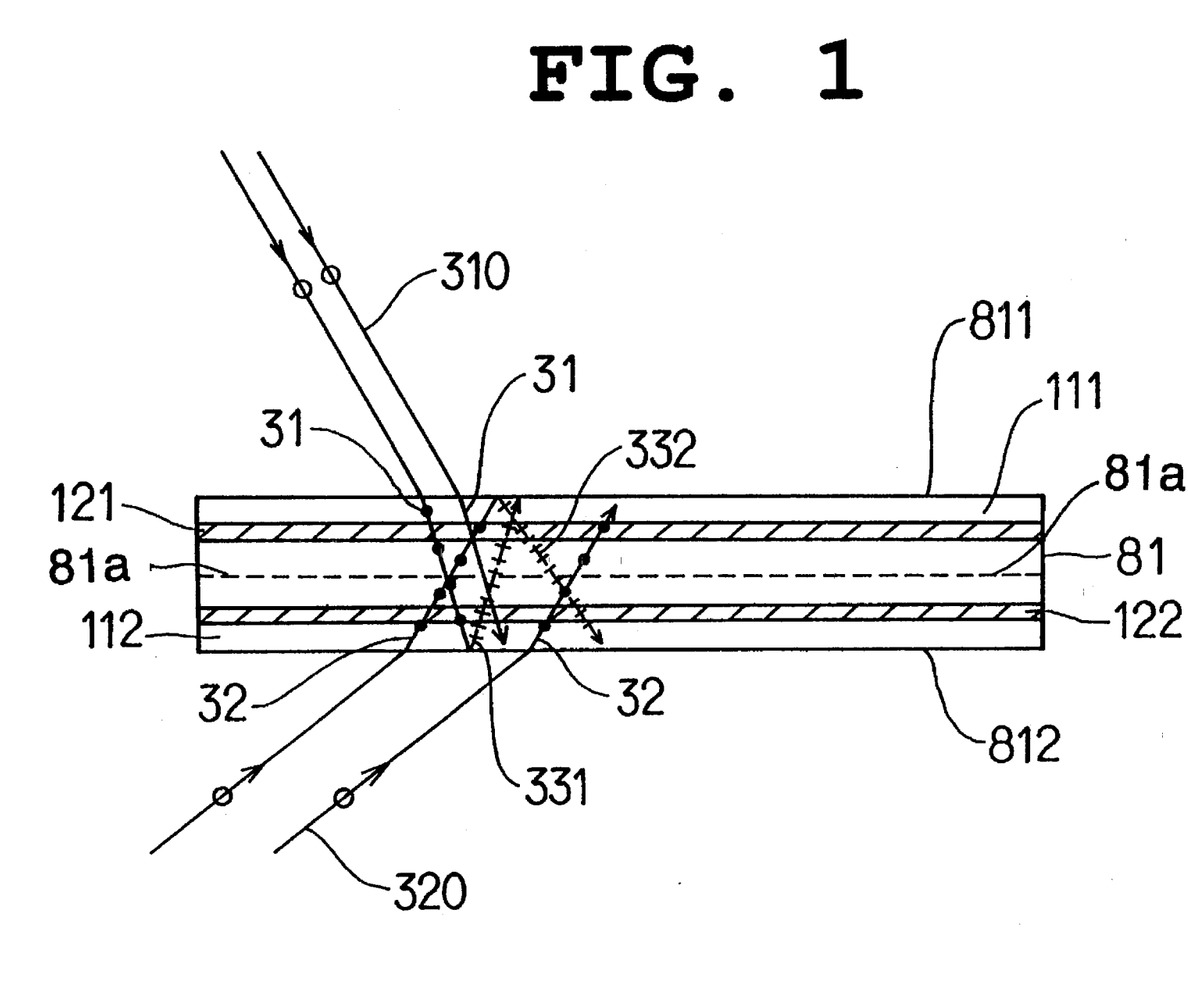
FIG. 1 is a system constructional view illustrating the hologram manufacturing method according to a first embodiment (two-beam method) of the present invention.

A manufacturing method for a hologram related to an embodiment according to the first aspect of the present invention will now be described referring to FIG. 1. In FIG. 1, a light marked with ○ (circle) is a circularly polarized light, a light marked with ● (dot) is an S-polarized light, and a light marked with — (dash) at right angles to the optical path is a P-polarized light.

This embodiment, as illustrated in FIG. 1, relates to a manufacturing method for a hologram which forms an interference fringe by irradiating two S-polarized luminous fluxes (reference light 31 and object light 32) to a substrate 81 for hologram formation from above and below the substrate 81 respectively. The substrate 81 has a hologram photosensitive layer 81a which forms the interference fringe thereon.

A reference light 310 and an object light 320 emitted from respective light sources (not illustrated) are circularly polarized lights. Both lights 310 and 320 are converted to the reference light 31 and the object light 32 through quarter-wave plates 111 and 112 respectively and then meet the substrate 81.

Between the substrate 81 and the quarter-wave plates 111 and 112 are disposed refractive index adjusting liquids 121 and 122. These three types of components 81, 111, 112, 121 and 122 are almost the same in refractive index, so that there is little reflection caused at the boundary therebetween.

On the other hand, as the atmosphere and the quarter-wave plates 111 and 112 are different in refractive index, reflection may be caused with ease on the boundaries 811 and 812.

The reference light 310 and object light 320 emitted from the respective light sources are circularly polarized lights, and the phase difference of two electric fields of these circularly polarized lights 310 and 320 is fixed so that the circularly polarized lights 310 and 320 can be converted to S-polarized lights by passing through the quarter-wave plates 111 and 112.

The lights 31 and 32 passed through the quarter-wave plates 111 and 112 respectively further pass through the substrate 81 and reach the opposite quarter-wave plates 112 and 111 respectively. The lights 31 and 32 are partly reflected on the interfaces 812 and 811 and turn to be surface reflected lights 331 and 332 respectively.

The above surface reflected lights 331 and 332 reciprocate between the quarter-wave plates 112 and 111 and turn to be P-polarized lights during the reciprocation (i.e., S-polarized light turns to circularly polarized light and reflected, and then turns to P-polarized light).

This means that the surface reflected lights 331 and 332 are P-polarized lights and there is no formation of an interference fringe between the S-polarized reference light 31 and the object light 32.

For this reason, according to this embodiment of the manufacturing method for a hologram, there is no formation of a ghost hologram due to the surface reflected lights 331 and 332 which are the strongest noise sources.

Furthermore, as the quarter-wave plates 111 and 112 are thin films, the manufacturing method according to this embodiment does not require any additional manufacturing space.

As described above, according to this embodiment, the formation of a ghost hologram due to the surface reflected lights 331 and 332 reflected on the interfaces 811 and 812 can be controlled, and a hologram manufacturing method which does not occupy a large amount manufacturing space can be provided.

(Second Embodiment)

Figure 2:
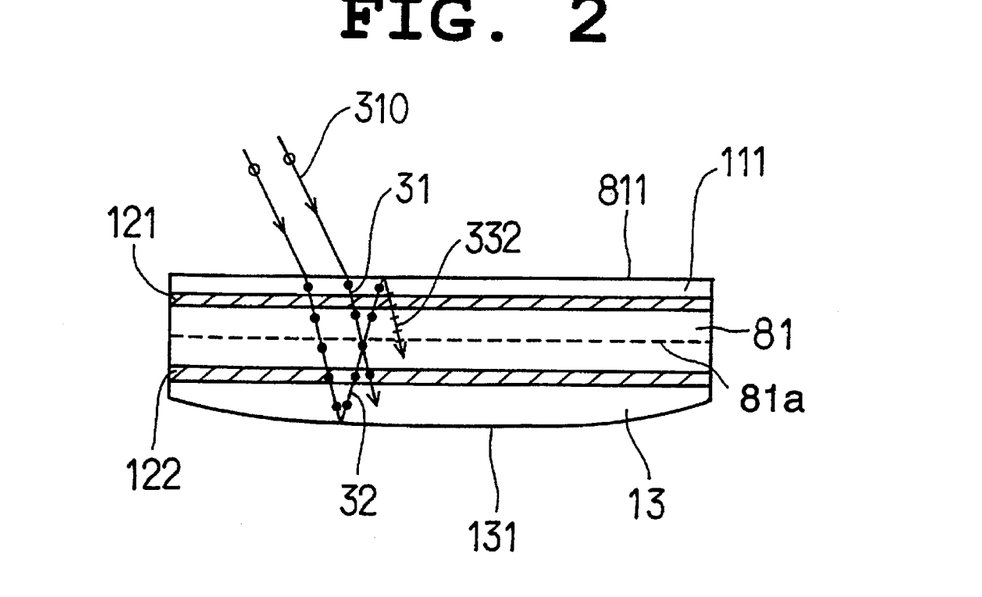
FIG. 2 is a system constructional view illustrating the hologram manufacturing method according to a second embodiment (one-beam method) of the present invention.

The second embodiment illustrated in FIG. 2 is another embodiment of the one-beam method according to the first aspect of the present invention.

This embodiment is an example of a manufacturing method for a hologram which has characteristics of a concave mirror used for an automotive head-up display, etc.

As illustrated in FIG. 2, on one side of the substrate 81 is disposed the quarter-wave plate 111 through the refractive index adjusting liquid 121, while on the other side thereof is disposed an optical element (concave mirror) 13 for use in reproduction through the refractive index adjusting liquid 122.

The reference light 310 emitted from the light source is a circularly polarized light which is so arranged to be converted to an S-polarized light by passing through the quarter-wave plate 111.

The light, which is passed through the quarter-wave plate 111, is transmitted through the substrate 81 as the reference light 31 and is reflected by a reflecting film provided on an interface 131 of the optical element 13. The reflected light acts as an object light 32 to form an interference fringe on a hologram photosensitive layer 81a of the substrate 81 in interference with the above reference light 31.

The object light 32 transmitted through the substrate 81 reaches the interface 811, and is partly reflected on the interface 811 as surface reflected light 332.

The above surface reflected light 332 which enters the substrate 81 again reciprocates the quarter-wave plate 111. During the reciprocation, the surface reflected light 332 is polarized and turns from an S-polarized lights to be a P-polarized light (i.e., S-polarized light changes to circularly polarized light and reflected, and then changes to P-polarized light).

As the object light 32 is an S-polarized light, however, there is no formation of an interference fringe between the object light 32 and the surface reflected light 332.

For this reason, despite the existence of the surface reflected light 332, there is no formation of a ghost hologram.

The hologram manufactured by the above manufacturing method is provided with a reproduced concave mirror which is the optical element 13. Therefore, the above hologram has a function of magnifying images like the concave mirror.

Incidentally, the optical element 13 is not limited to the concave mirror but may be a convex mirror, a plane mirror or a master hologram.

The above hologram may also be used for an automotive heads-up display, etc.

Figure 3:
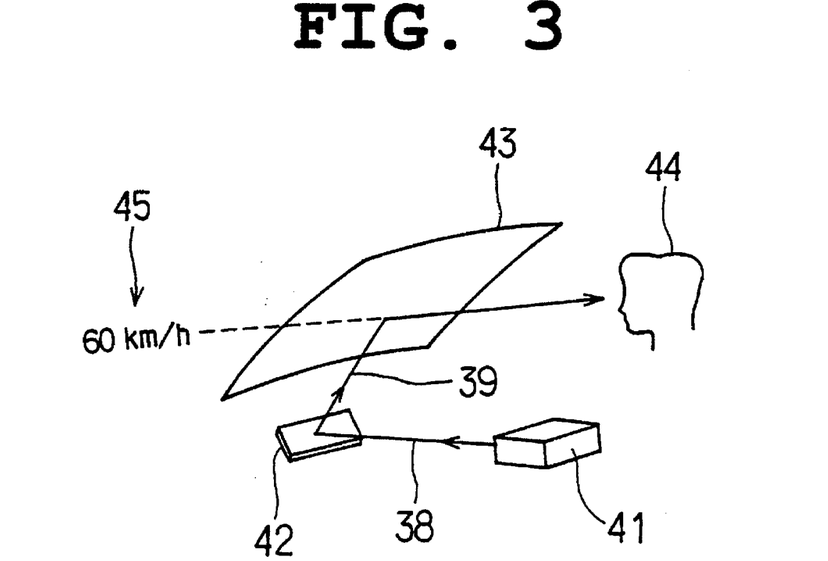
FIG. 3 is a schematic diagram of a heads-up display using a hologram obtained by the hologram manufacturing method according to the second embodiment.

In a heads-up display 40 illustrated in FIG. 3, an emitted light 38 emitted from a display unit 41 is reflected by a hologram 42 having a function of magnifying images (a characteristic of an concave mirror). A reproduced light 39 is re-reflected by a windshield 43, and a displayed image 45 is visually recognized by a viewer 44. On the surface of the windshield 43 is evaporated or printed a reflecting film or the like.

The viewer 44 visually recognizes the above reflected reproduced light 39 and also visually recognizes the displayed image 45 ahead of the windshield 43 as a virtual image.

All the other details are the same as those of the first embodiment.

(Third Embodiment)

Figure 5:
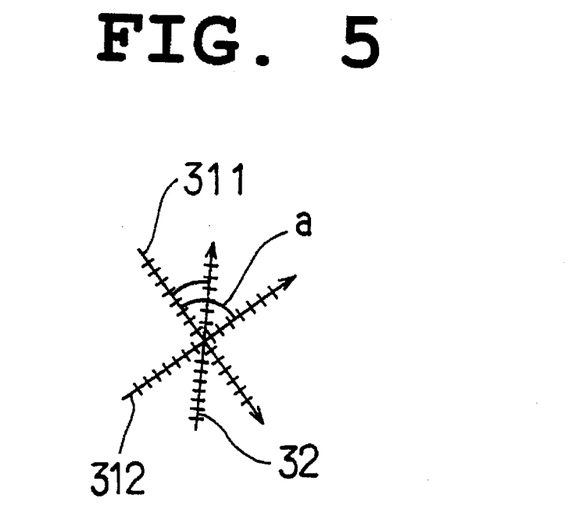
FIG. 5 is an enlarged view taken in the direction of an arrow A in FIG. 4.

Description will now be given to a hologram manufacturing method related to an embodiment according to the second aspect of the present invention referring to FIGS. 4 and 5.

As illustrated in FIG. 4, this embodiment is the manufacturing method for a hologram in which first and second prisms 25 and 26 having the same vertical angles of $\psi(\psi_1=\psi_2=\psi)$ are fittingly held on both sides of a substrate 81, the reference light 31 is irradiated to the substrate 81 from the side of the first prism 25 and the object light 32 is irradiated to the substrate 81 from the side of the second prism 26, and thereby an interference fringe is formed on a hologram photosensitive layer (not shown in FIG. 4) of the substrate 81.

The above reference light 31 is a P-polarized light. The relation between the above vertical angle $\psi$ and an incident angle $\theta$ of the reference light 311 is fixed so that an angle a between the surface reflected light 312 of the reference light 31 which is reflected to the side of the substrate 81 on an interface 261 of the second prism 26 and the reference light 311 which enters from the first prism 25 and travels to the substrate 81 can be a right angle as illustrated in FIG. 5.

On both sides of the substrate 81 are disposed the prisms 25 and 26 with respective refractive index adjusting liquids 121 and 122 interposed therebetween.

The reference light 31 which is a P-polarized light meets the first prism 25 at an incident angle $\theta$ and transmits the first prism 25 at a refraction angle $\theta_1$ (FIG. 7).

The transmitted light 311 in the first prism 25 meets the substrate 81 at an incident angle $\theta_2$ ($=\theta_1+\psi$) and meets the interface 261 of the second prism 26 at an incident angle $\theta_3$ ($=\theta_1+2\psi$) (FIG. 7).

The surface reflected light 312 reflected on the interface 261 returns to the substrate 81 at a reflection angle $\theta_3$.

The angle a between the surface reflected light 312 and the transmitted light 311 of the reference light 31 is equal to the above $2\theta_3$ and the value thereof is $\pi/2$. That is, $$a=2\theta_3=2(\theta_1+2\psi)=\pi/2 \quad (3)$$

Therefore, $$\psi=\pi/8-\theta_1/2 \quad (4)$$

The angle between the surface reflected light 312 and the transmitted light 311 of the reference light 31 is a right angle and these lights 311 and 312 are P-polarized lights. Therefore, there is no formation of an interference fringe due to the lights 311 and 312.

This means that there is no formation of a ghost hologram on the hologram photosensitive layer of the substrate 81 due to the surface reflected light 312.

Next, the size of the second prism 26 employed by this embodiment is compared with a prism employed by a conventional method (FIG. 11).

When the vertical angle of a prism 961 illustrated in FIG. 11 is $\alpha$, a condition that the surface reflected light 312 does not meet the substrate 81 is that ($2\theta_3+2\alpha$) is equal to or more than $\pi$. That is, $$(2\theta_3+2\alpha)\geq\pi \quad (5)$$

In FIG. 11, as $\theta_3=\theta_1+\psi+\alpha$, and $\psi$ in FIG. 4 can be expressed by Equation (4), $$\alpha\geq 3/16\,\pi-\theta_1/4 \quad (6)$$

Therefore, $$\alpha - \psi \geq \pi/16 + \theta_1/4 \quad (7)$$

That is, $\alpha > \psi$ is established, and therefore, the second prism 26 of this embodiment can be made smaller than the prism 961 according to the conventional manufacturing method.

As described above, according to this embodiment, a manufacturing method for a hologram which can control the formation of a ghost hologram due to the surface reflected light of the reference light, and at the same time, does not require an increased manufacturing space.

(Fourth Embodiment)

The fourth embodiment is another embodiment of a manufacturing method for a reproduced hologram by using the hologram manufactured by the manufacturing method according to the third embodiment as a master hologram.

Figure 6:
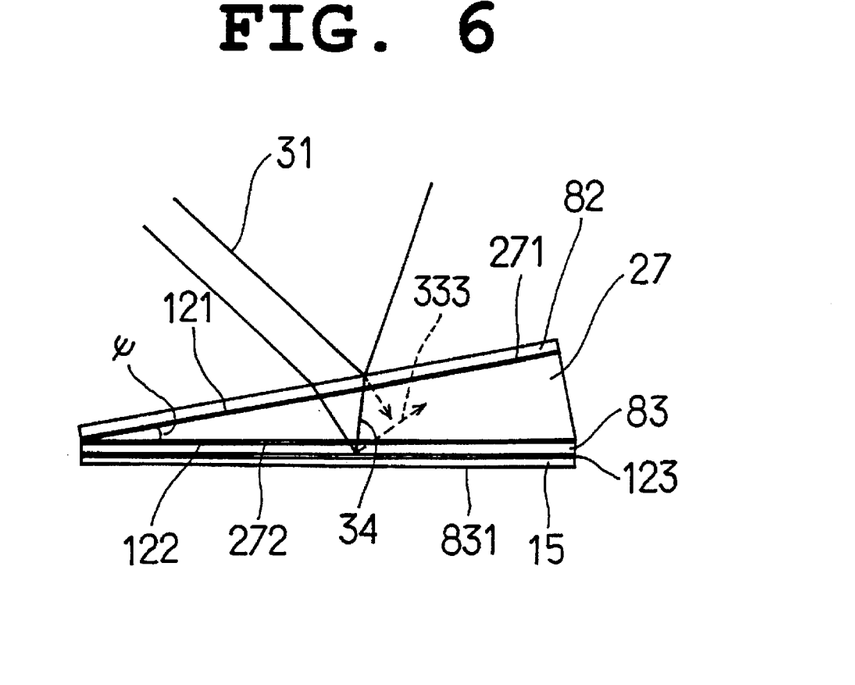
FIG. 6 is a system constructional view illustrating the hologram manufacturing method according to a fourth embodiment (one-beam method) of the present invention.

In this embodiment, as illustrated in FIG. 6, the hologram manufactured by the hologram manufacturing method illustrated in FIG. 4 is used as a master hologram 83, a prism 27 for reproduction having the same vertical angle $\psi$ as the vertical angle of the first prism 25 (FIG. 4) is used, a substrate 82 for reproducing is disposed on a first surface 271 which forms the vertical angle of the prism 27, and the master hologram 83 is disposed on a second surface 272 which forms the vertical angle of the prism 27.

From the side of the first surface 271 of the prism 27 for reproduction irradiated the same reference light 31 (either a P-polarized light or an S-polarized light will work) as that used for manufacturing the master hologram as illustrated in FIG. 4 at the same angle as that illustrated in FIG. 4. A reproduced light 34, which is the reference light 31 reflected by the master hologram, forms an interference fringe upon interaction with the reference light 31 on a hologram photosensitive layer (not shown in FIG. 6) of the substrate 82 for reproduction.

An optical absorbing film is disposed on an interface 831 of the above master hologram 83 (or an antireflection-coating glass) 15 to control a surface reflected light 333 on the interface 831.

Between the prism 27 and the substrate 82 and master hologram 83 and between the master hologram 83 and the optical absorbing film (or the antireflection-coating glass) 15 are interposed refractive index adjusting liquids 121, 122 and 123 respectively.

As the same reference light 31 as that illustrated in FIG. 4 is irradiated, the reproduced light 34 of the master hologram 83 is exactly the same reproduced light 34 as the object light 32 illustrated in FIG. 4.

Therefore, almost the same manufacturing conditions as those illustrated in FIG. 4 are reproduced in FIG. 6, and a hologram similar to the master hologram 83 with a little ghost hologram is formed on the hologram photosensitive layer of the dry plate 82 for reproduction.

Furthermore, as the surface reflected light 333 is absorbed by the optical absorbing film 15, the formation of the ghost hologram due to the surface reflected light 333 can be controlled.

Moreover, not only as the prism 27 for reproduction can use the first and second prisms 25 and 26 as they are, but also as the optical system which irradiates the reference light 31 can be used as it is, many manufacturing equipment can be shared between the manufacture of the master hologram and that of the reproduced hologram. Therefore, the efficiency of equipment use is high.

In addition to the above, the consistency of the manufacturing conditions can reliably be secured and a quality reproduced hologram can be obtained.

Furthermore, as the master hologram is reproduced, the space required for manufacture can be small (the construction illustrated in FIG. 6 is substantially space-saving in comparison with the construction illustrated in FIGS. 4, 10 and 11).

As described above, according to this embodiment, a high-quality reproduced hologram with an extremely high consistency can be manufactured from the master hologram in less manufacturing space.

(Fifth Embodiment)

The fifth embodiment is another embodiment in which a quarter-wave plate is disposed on the interface 831 of the master hologram 83 instead of the optical absorbing film 15 in FIG. 6.

In this embodiment, in the same way as the fourth embodiment, the reference light is a P-polarized light. In FIG. 6, a quarter-wave plate is provided instead of the optical absorbing film 15. Therefore, the surface reflected light 333 turns to be an S-polarized light by reciprocating the quarter-wave plate.

Accordingly, the surface reflected light 333 does not form any interference fringe in interaction with the reference light 31 which is a P-polarized light.

Accordingly, there is no formation of a ghost hologram due to the surface reflected light 333 on the hologram photosensitive layer of the substrate 82 for reproduction. All the other details of this embodiment remain the same as those of the fourth embodiment.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A manufacturing method for a hologram, comprising the steps of:

providing a quarter-wave plate on at least one surface of a substrate for hologram formation, said substrate having a hologram photosensitive layer;

irradiating said substrate with circularly polarized light via said quarter-wave plate, whereby said circularly polarized light is converted into one of P-polarized light and S-polarized light; and causing two luminous fluxes, both of which are one of P-polarized and S-polarized in association with said converted light to be irradiated from two directions with respect to said substrate to thereby form an interference fringe on said hologram photosensitive layer of said substrate.

2. The manufacturing method according to claim 1, wherein said quarter-wave plate is disposed on a first side of said substrate, one of said two luminous fluxes is a reference light incident on said substrate through the quarter-wave plate while the other of said two luminous fluxes is an object light which is a reflected light of said reference light which has passed through said substrate, said reflected light being reflected by an optical element disposed on second side of said substrate and entering said substrate again.

3. The manufacturing method for a hologram according to claim 1, wherein quarter-wave plates are provided on both sides of said substrate, and wherein said circularly polarized light is irradiated so as to enter from said both sides of said substrate via said quarter-wave plates, said light entering from one side of said substrate being irradiated as an object light while the light entering said from the other side of said substrate being irradiated as a reference light.

4. A manufacturing method for a hologram, comprising the steps of:

holding a substrate for hologram formation on a first side with a first prism having a vertical angle $\psi_1$ and on a second side with a second prism having a vertical angle $\psi_2$, said substrate having a hologram photosensitive layer;

irradiating a reference light from a first prism side to said substrate while irradiating an object light from a second prism side to said substrate, whereby an interference fringe is formed on said hologram photosensitive layer of said substrate, wherein said reference light is a P-polarized light, and a relation between said vertical angles $\psi_1$ and $\psi_2$ of the prisms and an incident angle $\theta$ of said reference light is set so that an angle a between reference light reflected from a surface of said second prism and said reference light traveling in said substrate is approximately a right angle.

5. The manufacturing method for a hologram according to claim 4, wherein said object light is also a P-polarized light, said vertical angles $\psi_1$ and $\psi_2$ of said first and second prisms, said incidence angle $\theta$ of said reference light and an incidence angle $\theta'$ of said object light respectively are selected so that an angle b between object light reflected from a surface of said first prism and said object light traveling through said substrate is approximately a right angle.

6. The manufacturing method for a hologram according to claim 4, wherein said first vertical angle $\psi_1$ and said second vertical angle $\psi_2$ are the same, and said first and second prisms hold said substrate so that apexes of said angles $\psi_1$ and $\psi_2$ are adjacent across said substrate.

7. A manufacturing method for a hologram, comprising the steps of:

preparing a hologram manufactured in accordance with said manufacturing method according to claim 4 as a master hologram;

forming an interference fringe on a hologram photosensitive layer provided on the substrate for reproduction by a reference light and a reproduced light of said master hologram to thereby produce a replica hologram of said master hologram, wherein said reproduced light is formed from said reference light transmitted through said substrate.

8. The manufacturing method for a hologram, comprising the steps of:

forming a master hologram by:

holding a substrate for hologram formation on a first side with a first prism having a vertical angle $\psi_1$ and on a second side with a second prism having a vertical angle $\psi_2$, said substrate having a hologram photosensitive layer; and irradiating a reference light from a first prism side to said substrate while irradiating an object light from a second prism side to said substrate, whereby an interference fringe is formed on said hologram photosensitive layer of said substrate, wherein said reference light is a P-polarized light, and a relation between said vertical angles $\psi_1$ and $\psi_2$ of the prisms and an incident angle $\theta$ of said reference light is set so that an angle a between reference light reflected from a surface of said second prism and said reference light traveling in said substrate is approximately a right angle;

forming an interference fringe on a hologram photosensitive layer provided on the substrate for reproduction by a reference light and a reproduced light of said master hologram to thereby produce a replica hologram of said master hologram, wherein said reproduced light is formed from said reference light transmitted through said substrate;

preparing a prism for reproduction having the same vertical angle $\psi_1$ as a vertical angle of the first prism;

disposing said substrate for reproduction on a first surface forming said vertical angle of said prism for reproduction; and disposing said master hologram on a second surface forming said vertical angle;

wherein said interference fringe forming step includes a step of irradiating said reference light which comprises light incident at the same angle as the light used for manufacturing said master hologram, said reference light being irradiated from said first surface of said prism for reproduction, and whereby said interference fringe is formed on said hologram photosensitive layer of said substrate for reproduction due to said reference light and said reproduced light, said reproduced light comprising reference light diffractively reflected by said master hologram.

9. The manufacturing method for a hologram according to claim 8, wherein one of a quarter-wave plate and an optical absorbing film is disposed on an interface between said master hologram and an atmosphere.

* * * * *

UNITED STATES PATENT AND TRADEMARK OFFICE
CERTIFICATE OF CORRECTION

PATENT NO. : 5,648,857
DATED : July 15, 1997
INVENTOR(S) : Hiroshi ANDO, et al.

It is certified that error appears in the above-identified patent and that said Letters Patent is hereby corrected as shown below:

The title page item [54], and Column 1, lines 1-4,

MANUFACTURING METHOD FOR HOLOGRAM WHICH CAN PREVENT THE FORMATION OF GHANT HOLOGRAMS DUE TO NOISE LIGHT" to

MANUFACTURING METHOD FOR HOLOGRAM WHICH CAN PREVENT THE FORMATION OF GHOST HOLOGRAMS DUE TO NOISE LIGHT--.

Signed and Sealed this

Third Day of February, 1998

*Attest:*

BRUCE LEHMAN

*Attesting Officer*   *Commissioner of Patents and Trademarks*